United States Patent [19]

Wissman

[11] Patent Number: 4,805,862
[45] Date of Patent: Feb. 21, 1989

[54] HARNESS FOR SUPPORTING A METER ON A FIRE HYDRANT AND THE COMBINATION OF A METER, FIRE HYDRANT AND HARNESS

[75] Inventor: Edward E. Wissman, Millersville, Md.

[73] Assignee: Washington Suburban Sanitary Commission, Hyattsville, Md.

[21] Appl. No.: 79,326

[22] Filed: Jul. 30, 1987

[51] Int. Cl.⁴ ............................................. E04G 3/00
[52] U.S. Cl. .................................... 248/229; 73/198; 137/272; 248/230; 251/143
[58] Field of Search ............... 248/230, 219.1, 218.4, 248/65, 540, 541, 229; 73/198, 201; 137/272, 282, 294; 251/143

[56] References Cited

U.S. PATENT DOCUMENTS

| | | | |
|---|---|---|---|
| 1,276,732 | 8/1918 | Darley | 73/861.65 |
| 1,394,383 | 10/1921 | Whitmore | 248/230 X |
| 2,780,205 | 2/1957 | Banck | 248/218.4 X |
| 2,928,641 | 3/1960 | Pfaff, Jr. | 248/219.1 |
| 3,190,600 | 6/1965 | Stanley | 248/219.1 |
| 3,196,673 | 7/1965 | Carson | 73/198 X |
| 3,363,640 | 1/1968 | Gallo, Sr. | 137/272 |
| 3,795,144 | 3/1974 | Marchesi | 73/201 |
| 4,047,668 | 9/1977 | DeWeese et al. | 73/861.65 X |

Primary Examiner—Alvin C. Chin-Shue
Assistant Examiner—David L. Talbott
Attorney, Agent, or Firm—Millen & White

[57] ABSTRACT

A harness is provided for supporting a water meter on a fire hydrant so as to minimize the possibility of the water meter being accidentally dislodged from the first hydrant. The harness comprises a first loop which fits around the conical top of the fire hydrant and a second loop which fits around a portion of the water meter. A rod extends between the two loops and tensioning means is provided to draw the two loops toward one another via advancing the rod so as to both pull the water meter back toward the fire hydrant and to suspend that end of the water meter to which a water hose is attached from the conical top of the fire hydrant.

7 Claims, 1 Drawing Sheet

HARNESS FOR SUPPORTING A METER ON A FIRE HYDRANT AND THE COMBINATION OF A METER, FIRE HYDRANT AND HARNESS

BACKGROUND OF THE INVENTION

The instant invention relates to water metering equipment. More particularly, the instant invention relates to water metering equipment wherein a meter is attached to a fire hydrant in order to measure the amount of water dispensed through the hydrant to a particular customer.

Many populated geographical areas are served by public water systems wherein companies, commissions or water departments dispense water to the population through a network of water mains. This network of mains frequently includes fire hydrants which can be used to dispense water not only for fire fighting purposes, but also for other uses such as providing water to construction sites. Supplying water is a relatively expensive undertaking and users are generally billed by the supplier for the amount of water consumed. When water is dispensed from a fire hydrant to a user, such as a construction company, a general practice is to provide the user with a meter which records the amount of water dispensed to the customer from the fire hydrant.

A fire hydrant dispenses relatively large volumes of water at relatively high velocities. Accordingly, the meter loaned to customers is relatively large and heavy. Standard practice is to cantilever the meter from the hydrant by coupling the meter to the hydrant with a threaded collar. A hose, generally having the diameter of a fire hose, is then connected to the free end of the meter. Flow through the hose is controlled by a valve, usually integral with the meter, positioned between the meter and hose. In accordance with the standard practice, the only structure supporting the meter is the threaded collar and perhaps abutment between the inlet end of the meter and the outlet of the fire hydrant. In that the meter is relatively heavy, its weight being increased by both the valve and the heavy fire hose attached to the other end of the meter, considerable stress is placed on the coupling. If the coupling is not snugly fastened or if the hose or meter are struck by a massive object such as a bulldozer or truck, there is a substantial likelihood that the coupling may fracture or otherwise disconnect from the fire hydrant, propelling the heavy meter away from the fire hydrant at high velocity due to the energy imparted thereto by pressurized water in the hydrant. This of course creates a safety hazard as well as resulting in considerable inconvenience due to massive amounts of water being dumped on the site and due to possible damage to the meter itself. The prior art offers no solution to this particular problem.

SUMMARY OF THE INVENTION

It is an object of the instant invention to minimize the possibility of and the danger inherent in fire hydrant water meters being dislodged from fire hydrants and to provide new and improved structure for supporting water meters on fire hydrants.

In view of these objects and other objects, the instant invention contemplates in combination, a fire hydrant, a water meter attached to the fire hydrant and a harness suspending the remote end of the water meter from the fire hydrant.

Preferably the harness has a first loop which fits around the conical top of the fire hydrant and a second loop positioned generally orthogonal to the first loop which fits around the meter. The loops are connected to one another by a rod which is pivoted to the first loop and slidably linked to the second loop by a sleeve through which a threaded end of the rod projects. A nut is threaded to the threaded end of the rod and tensions the rod upon being advanced toward the first loop.

DESCRIPTION OF THE PREFERRED EMBODIMENT

Figure 1:
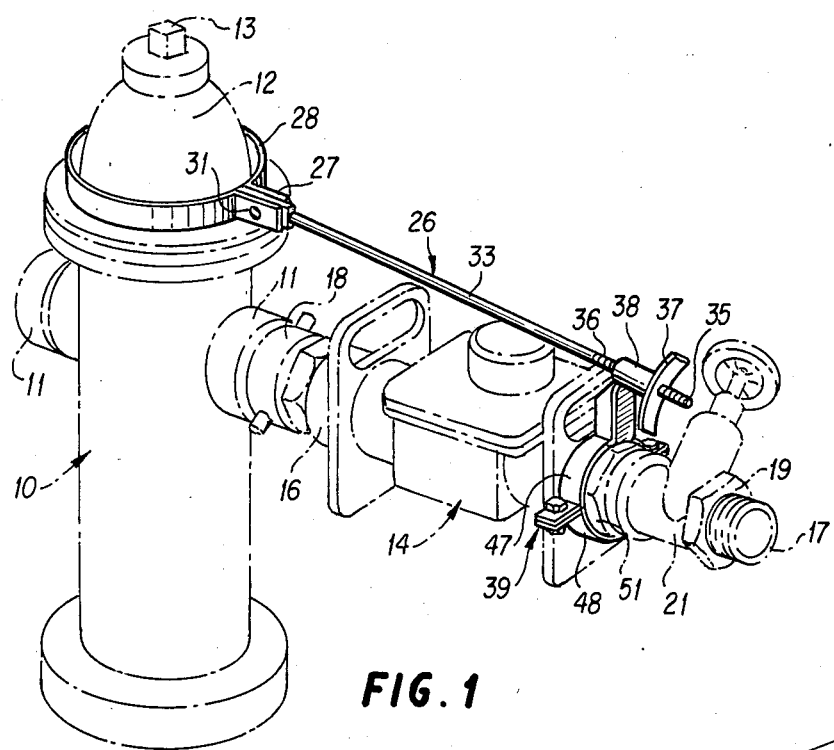
FIG. 1 is a perspective view showing in combination a fire hydrant, a water meter attached thereto and a harness supporting and securing the meter on the hydrant in accordance with the principles of the instant invention.

Referring now to FIG. 1 there is shown a fire hydrant designated generally by the numeral 10, the fire hydrant having an outlet 11 through which water is dispensed and a conical top 12 through which a valve operating stem 13 extends. The outlet 11 is externally configured to receive a standard fire hose coupling (not shown). When the fire hydrant 10 is being used to dispense water for purposes other than firefighting, for example at construction sites, a meter, designated generally by the numeral 14, is secured to the outlet 11. The meter 14 has an inlet end 16 and a remote outlet end 17. The inlet end 16 has a coupling collar 18 thereon internally configured for coupling engagement with the external coupling surface on the fire hydrant outlet 11 to secure the meter 14 thereto, preferably without leakage. The outlet end 17 of the meter has a coupling 17 for coupling a hose (not shown), such as a fire hose, in order to transport water from the hydrant 10 to a remote point, if necessary. Disposed between the meter 14 and the coupling 19 for the fire hose is a valve 21 for controlling flow from the fire hydrant 10 through the hose.

When the valve 21 is only partially opened and the valve in the hydrant 10 is fully open, considerable pressure exists inside of the meter 14 in addition to the pressure which exists due to forcing water from the hydrant to flow through the constriction of the hose.

As was discussed in the "Background of the Invention," if the hose attached to the coupling 19 or the meter 14 is struck by construction equipment such as a truck or bulldozer, the valve 14 can dislodge from the fire hydrant 10 and be propelled at a relatively high velocity due to pressure created therein by pressure existant in the hydrant. In accordance with the principles of the instant invention, this problem is minimized by securing the valve 14 to the hydrant 10 with a harness, designated generally by the numeral 26. The harness 26 has a first end 27 to which is attached a hoop 28 which is circular and has a diameter slightly greater than the maximum diameter of the conical cover 12 on the fire hydrant 10. The hoop 28 has at one circumferential location a pair of opposed flanges 29 and 30. The flanges 29 and 30 have an aligned bore therein through which bores passes the shank of a double headed rivet 31. Sandwiched between the flanges 29 and 30 is a flat end 32 of a circular rod 33. The flat end 32 of the circular rod 33 has a bore which aligns the bores in the flanges 29 and 30 so that the shank of the rivet 31 provides a pivot whereby the rod 33 can pivot at least slightly with respect to the hoop 28.

The second end 35 of the rod 33 has a helical thread 36 thereon which is threaded a wing nut 37. Inboard of the wing nut 37 there is positioned a sleeve 38 from which is depended a collar designated generally by numeral 39 held in spaced relation to the sleeve 38 by a strut 41. The strut 41 is welded at one end to the collar 38 and at the other end to the sleeve 39 with the sleeve having its axis aligned with the axis of the rod 33 and disposed at an oblique angle with respect to the axis of the collar 39. Preferably, the strut 41 is strengthened by a flange 44 disposed normally to the strut and welded to the collar 39.

Figure 2:
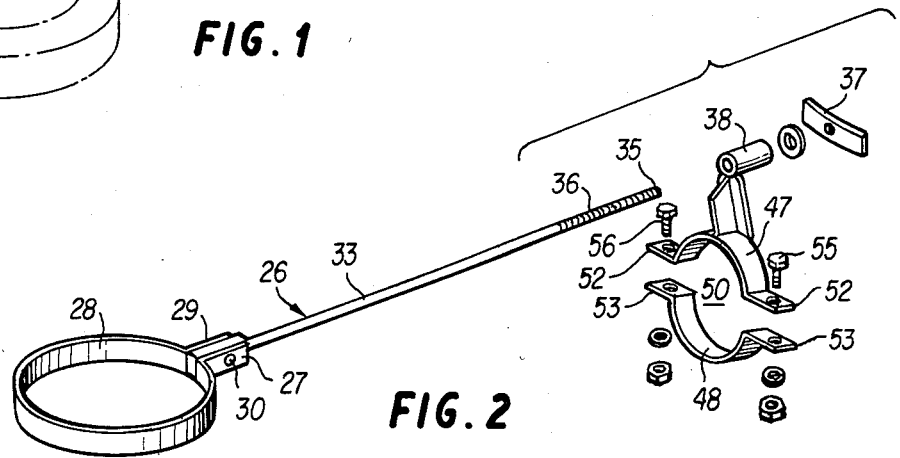
FIG. 2 is an exploded view showing the various components of the harness.
Figure 3:
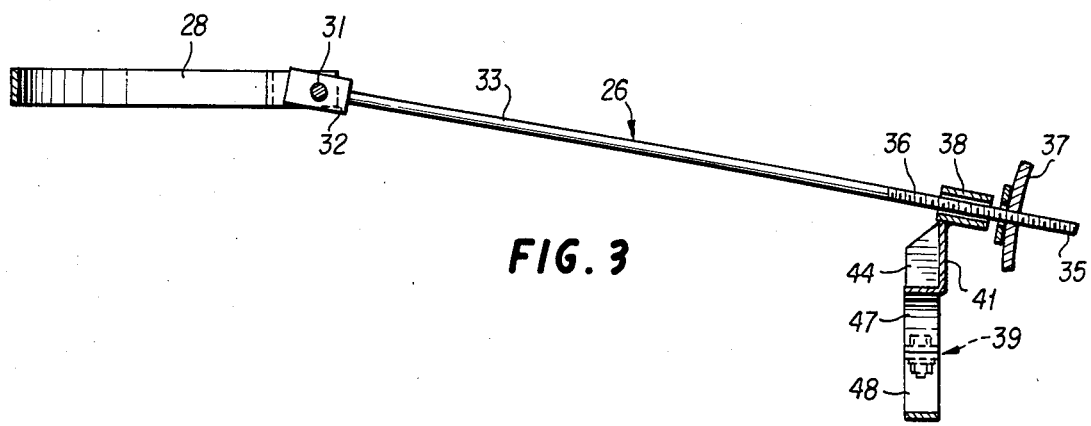
FIG. 3 is a side view of the harness shown assembled, but not attached to a hydrant and meter.

As is best seen in FIG. 2, the collar 39 is formed by a pair of opposed, substantially U-shaped straps 47 and 48 which together define a circular opening 50 in which is received a cylindrical portion 51 of the meter 14. The opposed straps 47 and 48 each have opposed flanges 52 and 53 which are bolted together by bolts 55 and 56 around the barrel portion 51 of the water meter 14.

Generally, the utility dispensing the meters 14 retrofits a harness 25 on each meter prior to providing the meter to a water user. This is accomplished by simply bolting the U-shaped straps 47 and 48 in place on the barrel portion 51 of the meter, inserting the rod 33 through the sleeve 38 and threading the wing nut 37 on the threads 36 of the rod. The user then installs the water meter 14 in the field by first coupling the inlet end 16 to the fire hydrant outlet 11 with the coupling collar 18 and thereafter positioning the hoop 28 over the conical top 12 of the hydrant. The wing nut 37 is then rotated on the threads 36 and advanced toward the hoop 28 in order to pull the rod 33 through the sleeve 38 and thereby tension the rod once the hoop is pulled against the conical top 12. This tends to lift the outlet end 17 of the meter and press the inlet end 16 of the meter against the outlet 11 of the fire hydrant 10. If the meter 14 or the hose coupled thereto is struck by construction equipment, the danger of the meter being decoupled from the fire hydrant 10 and being propelled away from the fire hydrant is substantially reduced.

Without further elaboration, it is believed that one skilled in the art can, using the preceding description, utilize the present invention to its fullest extent.

I claim:

1. In combination;
   a fire hydrant having a horizontal outlet and a conical top;
   a water meter having an inlet pipe extending therefrom in a first direction and an outlet pipe extending therefrom in a second direction, the outlet pipe being parallel to and aligned with the inlet pipe, and means for coupling the inlet pipe to the outlet of the fire hydrant wherein the water meter extends from the fire hydrant in the horizontal direction and is cantilevered from the outlet of the fire hydrant, and
   rod means connected to the conical top of the fire hydrant and connected to the water meter for further supporting the water meter in cantilevered suspension on the fire hydrant and holding the inlet pipe and coupling means in juxtaposition with the outlet of the fire hydrant, whereby the danger of the water meter being dislodged from the fire hydrant is minimized.

2. The combination of claim 1 wherein the rod means for suspending the meter on the fire hydrant includes a first loop member looped around the conical top of the fire hydrant for connecting thereto, a second loop member looped around the outlet pipe of the meter for connecting thereto, and a rod member joining the first and second looped members with one another.

3. The combination of claim 2, further including member for tensioning the rod means between the first and second members.

4. The combination of claim 3 wherein the means for tensioning the rod member includes a threaded portion on the rod members, a sleeve on the second loop means which slidably receives the rod member and a nut outboard of the sleeve, whereby when the nut is rotated the rod member is pulled through the sleeve to increase tension on the rod member.

5. The combination of claim 4 further including means for detachably securing the second loop member semi-permanently to the outlet pipe of the meter whereby the support means may be retrofitted to form the combination.

6. The combination of claim 2 wherein the conical top has a selected diameter and wherein the first loop member has a fixed diameter greater than the diameter of the conical top of the fire hydrant.

7. The combination of claim 1 wherein the water meter has a selected length and wherein the rod means has a length greater than that of the water meter.

* * * * *